(12) United States Patent
Shaffer et al.

(10) Patent No.: US 8,570,909 B1
(45) Date of Patent: Oct. 29, 2013

(54) METHOD AND SYSTEM FOR PROVIDING AN INDICATION OF A COMMUNICATION

(75) Inventors: Shmuel Shaffer, Palo Alto, CA (US); Steven L. Christenson, Campbell, CA (US); Larry R. Metzger, Wake Forest, NC (US); Chanh N. Vuong, San Jose, CA (US); Deon J. Chatterton, Livermore, CA (US); Byron G. Stevens, Newmarket (CA)

(73) Assignee: Cisco Technology, Inc., San Jose, CA (US)

(*) Notice: Subject to any disclaimer, the term of this patent is extended or adjusted under 35 U.S.C. 154(b) by 1106 days.

(21) Appl. No.: 11/550,234

(22) Filed: Oct. 17, 2006

(51) Int. Cl.
*H04Q 11/00* (2006.01)

(52) U.S. Cl.
USPC .................. 370/260; 455/154.1; 455/521

(58) Field of Classification Search
USPC ......... 370/252, 260; 455/154.1, 154.2, 158.2, 455/159.2
See application file for complete search history.

(56) References Cited

U.S. PATENT DOCUMENTS

| | | | |
|---|---|---|---|
| 4,359,603 A | 11/1982 | Heaton | 370/267 |
| 4,730,306 A | 3/1988 | Uchida | 370/263 |
| 5,048,082 A | 9/1991 | Krafft et al. | 379/406.07 |
| 5,099,510 A | 3/1992 | Blinken et al. | 379/202.01 |
| 5,436,896 A | 7/1995 | Anderson et al. | 370/260 |
| 5,539,741 A | 7/1996 | Barraclough et al. | 370/267 |
| 5,625,407 A | 4/1997 | Biggs et al. | 348/14.11 |
| 6,011,851 A | 1/2000 | Connor et al. | 381/17 |
| 6,094,578 A | 7/2000 | Purcell et al. | 455/426 |
| 6,178,237 B1 | 1/2001 | Horn | 379/202.01 |
| 6,185,205 B1 | 2/2001 | Sharrit et al. | 370/389 |
| 6,233,315 B1 | 5/2001 | Reformato et al. | 379/88.01 |
| 6,275,708 B1 * | 8/2001 | Lahtinen | 455/458 |
| 6,327,567 B1 | 12/2001 | Willehadson et al. | 704/270 |
| 6,374,100 B1 | 4/2002 | Smith et al. | 455/419 |
| 6,400,816 B1 | 6/2002 | Hjalmtysson et al. | 379/201.03 |
| 6,404,873 B1 | 6/2002 | Beyda et al. | 379/202.01 |
| 6,408,327 B1 | 6/2002 | McClennon et al. | 709/204 |
| 6,418,214 B1 | 7/2002 | Smythe et al. | 379/202.01 |
| 6,438,390 B1 * | 8/2002 | Awan | 455/566 |
| 6,453,022 B1 | 9/2002 | Weinman, Jr. | 379/88.13 |
| 6,501,739 B1 | 12/2002 | Cohen | 370/260 |
| 6,608,820 B1 | 8/2003 | Bradshaw, Jr. | 370/260 |
| 6,792,092 B1 | 9/2004 | Michalewicz | 379/202 |

(Continued)

FOREIGN PATENT DOCUMENTS

| | | |
|---|---|---|
| WO | WO 01/91485 | 11/2001 |
| WO | WO 02/074051 | 9/2002 |

OTHER PUBLICATIONS

PCT International Search Report and Written Opinion (ISA/US) for PCT/US06/19227; 7 pages, Sep. 4, 2007.

(Continued)

*Primary Examiner* — Mark Rinehart
*Assistant Examiner* — Matthew Hopkins
(74) *Attorney, Agent, or Firm* — Baker Botts L.L.P.

(57) ABSTRACT

A method for providing an indication of a communication includes facilitating communications between a plurality of endpoints within each of a plurality of virtual talk groups. The method also includes monitoring the communications between the plurality of endpoints within each of the plurality of virtual talk groups. The method further includes, upon detecting a first communication within a first virtual talk group of the plurality of virtual talk groups, activating a first indicator. The first indicator indicates the detection of the first communication. The method also includes, upon the occurrence of a first deactivating event, deactivating the first indicator.

42 Claims, 2 Drawing Sheets

(56) References Cited

U.S. PATENT DOCUMENTS

| | | | |
|---|---|---|---|
| 6,850,496 B1 | 2/2005 | Knappe et al. | 370/260 |
| 6,873,854 B2 | 3/2005 | Crockett et al. | 455/518 |
| 6,882,856 B1* | 4/2005 | Alterman et al. | 455/519 |
| 6,885,874 B2 | 4/2005 | Grube et al. | 455/520 |
| 6,895,254 B2* | 5/2005 | Dorenbosch | 455/518 |
| 6,912,389 B2 | 6/2005 | Bright et al. | 455/433 |
| 6,982,961 B2 | 1/2006 | Refai et al. | 370/265 |
| 6,987,480 B1 | 1/2006 | Kotick et al. | 342/41 |
| 6,987,841 B1 | 1/2006 | Byers et al. | 379/88.17 |
| 6,993,120 B2 | 1/2006 | Brown et al. | 379/88.13 |
| 6,993,304 B2* | 1/2006 | Fujiki et al. | 455/159.2 |
| 6,996,406 B2 | 2/2006 | Lection et al. | 455/457 |
| 6,999,782 B2 | 2/2006 | Shaughnessy et al. | 455/518 |
| 6,999,783 B2 | 2/2006 | Toyryla et al. | 455/519 |
| 7,003,286 B2 | 2/2006 | Brown et al. | 455/416 |
| 7,006,607 B2 | 2/2006 | Garcia | 379/88.18 |
| 7,010,106 B2 | 3/2006 | Gritzer et al. | 379/202.01 |
| 7,010,109 B2 | 3/2006 | Gritzer et al. | 379/202.01 |
| 7,010,275 B2 | 3/2006 | Davies | 455/90.2 |
| 7,013,279 B1 | 3/2006 | Nelson | 704/270 |
| 7,031,700 B1 | 4/2006 | Weaver et al. | 455/420 |
| 7,035,385 B2 | 4/2006 | Levine et al. | 379/88.23 |
| 7,058,168 B1 | 6/2006 | Knappe et al. | 379/204.01 |
| 7,079,857 B2 | 7/2006 | Maggenti et al. | 455/518 |
| 2001/0028321 A1 | 10/2001 | Krasner | 342/357.1 |
| 2002/0013813 A1 | 1/2002 | Matsuoka | 709/204 |
| 2002/0152305 A1 | 10/2002 | Jackson et al. | 709/224 |
| 2002/0178364 A1 | 11/2002 | Weiss | 713/182 |
| 2003/0083047 A1* | 5/2003 | Phillips et al. | 455/412 |
| 2003/0100326 A1 | 5/2003 | Grube et al. | 455/515 |
| 2004/0054428 A1 | 3/2004 | Sheha et al. | 700/56 |
| 2004/0070515 A1* | 4/2004 | Burkley et al. | 340/825.49 |
| 2004/0139320 A1 | 7/2004 | Shinohara | 713/168 |
| 2004/0185863 A1 | 9/2004 | Ogami | 455/452.1 |
| 2004/0192353 A1 | 9/2004 | Mason et al. | 455/457 |
| 2004/0249949 A1 | 12/2004 | Gourraud et al. | 709/227 |
| 2005/0135348 A1 | 6/2005 | Staack | 370/353 |
| 2005/0174991 A1 | 8/2005 | Keagy | 370/352 |
| 2005/0232207 A1 | 10/2005 | Antoniadis et al. | 370/338 |
| 2005/0265256 A1 | 12/2005 | Delaney | 370/254 |
| 2006/0114847 A1 | 6/2006 | Dssouli et al. | 370/261 |
| 2006/0118636 A1 | 6/2006 | Miles et al. | 235/472 |
| 2006/0165060 A1 | 7/2006 | Dua | 370/352 |
| 2007/0030144 A1 | 2/2007 | Titus et al. | 340/534 |
| 2007/0060144 A1 | 3/2007 | Mills et al. | 455/445 |
| 2007/0115848 A1 | 5/2007 | Chean et al. | 370/252 |
| 2008/0037461 A1 | 2/2008 | Biltz et al. | 370/328 |
| 2008/0167049 A1 | 7/2008 | Karr et al. | 455/456 |

OTHER PUBLICATIONS

Shaffer, et al., *Method and System for Joining a Virtual Talk Group*, U.S. Appl. No. 11/421,994, filed Jun. 2, 2006.

Shaffer, et al., *Method and System for Managing a Plurality of Virtual Talk Groups*, U.S. Appl. No. 11/421,999, filed Jun. 2, 2006.

Rivero-Angeles, Mario et al., *Random-Access Control Mechanism Using Adaptive Traffic Load in ALOHA and CSMA Strategies for EDGE*, May 2005, IEEE Transactions on Vehicular Technology, Vo. 54, No. 3, 2 (1161) May 2005.

NetworkFirst Interoperability Solved, Data Sheet, M/A-COM, Inc., ECR-7018A, http://www.networkfirst.com/resources/pdf/NetworkFirstRevised5_03.pdf, 6 pages.

Network Solution:, Information Sheet, NetworkFirst, M/A-COM, Inc., http://www.networkfirst.com/features/solution, 2 pages.

It's Our Network That Makes the Difference, Information Sheet, OpenSky Network, M/A-COM, Inc., http://www.opensky.com/network/index.asp, 2 pages.

Network Management, Information Sheet, OpenSky Network, M/A-COM, Inc., http://www.opensky.com/network/netmgmtsys.asp, 2 pages.

ACU-1000™ Interoperability NOW™, Information Sheet, Raytheon JPS Communications, http://www.jps.com/downloads/PDFS/acuupgrade.pdf, 4 pages.

Interoperability Gateway, OpenSky, NetworkFirst, P25$^{IP}$, Data Sheet, M/A-COM, Inc. ECR-7054, http://www.opensky.com/network/7054.pdf, 2 pages.

C3 Maestro$^{IP}$ Dispatch Console, OpenSky, NetworkFirst, P25$^{IP}$, Data Sheet, M/A-COM, Inc. ECR-7160A, http://www.opensky.com/network/7160.pdf, 2 pages.

V$^{IP}$ Dispatch Console, OpenSky, NetworkFirst, P25$^{IP}$, Data Sheet, M/A-COM, Inc. ECR-7241B, http://www.opensky.com/network/7241B.pdf, 2 pages.

J. Polk, et al., Dynamic Host Configuration Protocol Option for Coordinate-based Location Configuration Information, Network Working Group, Internet RFC 3825, Category: Standards Track, The Internet Society, 15 pages, Jul. 2004.

OnStar Technology, Information Sheet, OnStar Corp., http://www.onstar.com/us_english/jsp/explore/onstar_basics/technology.jsp, 3 pages, 2005.

Cisco IP Interoperability and Collaboration System, Q&A, Copyright © Cisco Systems, Inc. www.cisco.com, 4 pages.

Cisco IPICS, Solution Overview, Copyright © Cisco Systems, Inc., www.cisco.com/go/ipics, 6 pages.

Matthews, et al., *A New Interoperability Paradigm A Concept Proposal*, Mar. 2006, Worcester Polytechnic Institute, WPI Bioengineering Institute (Mar. 2006), 15 pages.

Shaffer, et al., U.S. Appl. No. 11/149,041, filed Jun. 8, 2005, *Method and System for Communicating Using Position Information*.

Shaffer, et al., U.S. Appl. No. 11/201,832, filed Aug. 10, 2005, *Method and System for Automatic Configuration of Virtual Talk Groups Based on Location of Media Source*.

Shaffer, et al., U.S. Appl. No. 11/202,400, filed Aug. 10, 2005, *Method and System for Communicating Media Based on Location of Media Source*.

Shaffer, et al., U.S. Appl. No. 11/202,403, filed Aug. 10, 2005, *Method and System for Providing Interoperable Communications with Location Information*.

Shaffer, et al., U.S. Appl. No. 11/214,582, filed Aug. 29, 2005, *Method and System for Conveying Source Location Information*.

Shaffer, et al., U.S. Appl. No. 11/364,146, filed Feb. 27, 2006, *Method and System for Providing Interoperable Communication with Congestion Management*.

Shaffer, et al., U.S. Appl. No. 11/365,113, filed Feb. 28, 2006, *Method and System for Providing Interoperable Communication with Dynamic Event Area Allocation*.

Shaffer, et al., U.S. Appl. No. 11/399,031, filed Apr. 5, 2006, *Method and System for Managing Virtual Talk Groups*.

Shaffer, et al., U.S. Appl. No. 11/382,496, filed May 10, 2006, *Providing Multiple Virtual Talk Group Communication Sessions*.

Kalley, et al., U.S. Appl. No. 11/383,998, filed May 18, 2006, *Providing Virtual Talk Group Communication Sessions in Accordance with Endpoint Resources*.

Shaffer, et al., U.S. Appl. No. 11/421,994, filed Jun. 2, 2006, *Method and System for Joining a Virtual Talk Group*.

Shaffer, et al., U.S. Appl. No. 11/421,999, filed Jun. 2, 2006, *Method and System for Managing a Plurality of Virtual Talk Groups*.

Shaffer, et al., U.S. Appl. No. 11/550,234, filed Dec. 28, 2006, *Method and System for Providing Congestion Management within a Virtual Talk Group*.

Shaffer, et al., U.S. Appl. No. 11/746,960, filed May 10, 2007, *Method and System for Handling Dynamic Incidents*.

PCT Notification of Transmittal of the International Search Report and the Written Opinion of the International Searching Authority, or the Declaration, mailed Apr. 9, 2007, corresponding to PCT/US06/30294 filed Aug. 2, 2006 (20 pages).

PCT Notification of Transmittal of the International Search Report and the Written Opinion of the International Searching Authority, or the Declaration, mailed Feb. 27, 2007, corresponding to PCT/US06/30447 filed Aug. 3, 2006 (20 pages).

NetworkFirst Interoperability Solved, Data Sheet, M/A-COM, Inc., ECR-7018A, http://www.networkfirst.com/resources/pdf/NetworkFirstRevised5_03.pdf, 6 pages, May 2003.

Network Solution:, Information Sheet, NetworkFirst, M/A-COM, Inc., http://www.networkfirst.com/features/solution, 2 pages, 2003.

(56) References Cited

OTHER PUBLICATIONS

ACU-1000™ Interoperability NOW™, Information Sheet, Raytheon JPS Communications, http://www.jps.com/downloads/PDFS/acuupgrade.pdf, 4 pages, Mar. 2004.

Interoperability Gateway, OpenSky, NetworkFirst, P25$^{IP}$, Data Sheet, M/A-COM, Inc. ECR-7054, http://www.opensky.com/network/7054.pdf, 2 pages, May 2003.

C3 Maestro$^{IP}$ Dispatch Console, OpenSky, NetworkFirst, P25$^{IP}$, Data Sheet, M/A-COM, Inc. ECR-7160A, http://www.opensky.com/network/7160.pdf, 2 pages, Oct. 2003.

V$^{IP}$ Dispatch Console, OpenSky, NetworkFirst, P25$^{IP}$, Data Sheet, M/A-COM, Inc. ECR-7241B, http://www.opensky.com/network/7241B.pdf, 2 pages, Oct. 2004.

Cisco IP Interoperability and Collaboration System, Q&A, Copyright © Cisco Systems, Inc. www.cisco.com, 4 pages, Oct. 2005.

Cisco IPICS, Solution Overview, Copyright © Cisco Systems, Inc., www.cisco.com/go/ipics, 6 pages, Oct. 2005.

MRT Urgent Communications: Service, Safety, Security, M/A-Com Emphasizes Power of IP in Seven Announcements at APCO, Aug. 18, 2002, 6 pages. http://mrtmag.com/products/new/radio_macom_emphasizes_power, Aug. 18, 2002.

Jim McKay, *Government Technology*, "Intact Amid Chaos", Mar. 2005, 2 pages, Mar. 2005.

Ian Hoffman, *Oakland Tribune*, "Oakland's New Radios Pass Test, City, Regional Agencies Get Green Light to Buy Public-Safety Equipment," 2007, 2 pages (reprinted by Tyco Electronics and available at http://www.macom-wireless.com/news/oaklands%20new%20radios.asp).

MRT Urgent Communications: Service, Safety, Security, "5 For '05 Technologies," Dec. 1, 2004, 9 pages. http://mrtmag.com/mag/radio_technologies.

MRT Urgent Communications: Service, Safety, Security, John Facella, "ROIP Success Is in the Details," Dec. 1, 2004, 3 pages. http://mrtmag.com/mag/radio_roip_success_details/.

Ann Imse, *Rocky Mountain News*, "Radio Breakthrough for Cops, Firefighters," Dec. 10, 2004, 2 pgs.

*First Responder Communications*, A Supplement to MRT and Fire Chief, "IP Opens Eyes," Aug. 2004, 5 pages.

*MRT, Mobile Radio Technology*, "IP Evangelist," Apr. 2004, 4 pages, www.iwce-mrt.com.

Ron Bender, et al., *MRT; Mobile Radio Technology* "Multiple Choices for Critical Communications," Oct. 2001, 4 pages, www.mrtmag.com.

Jay Herther, et al., *MRT; Mobile Radio Technology*, "Voice-over-Interintranet Protocol for Critical Communications," Aug. 2001, 4 pages, www.mrtmag.com.

*What's New in Radio Communications*, Aug./Sep. 2001, vol. 14 No. 1, Inside: Marine Radio, 2 pages, www.westwick-farrow.com.au.

* cited by examiner

METHOD AND SYSTEM FOR PROVIDING AN INDICATION OF A COMMUNICATION

TECHNICAL FIELD OF THE INVENTION

This invention relates in general to communication systems and, more particularly, to a method and system for providing an indication of a communication.

BACKGROUND OF THE INVENTION

Many public and private groups, such as security and safety personnel (e.g., police, fire fighters and ambulance drivers) use various different communication devices operating on various different communication networks. For example, many public service organizations, such as police, fire and EMT, utilize land mobile radios communicating through push-to-talk technologies. Each organization may have its own communication network and/or its own communications channel. However, communications among different endpoints of different networks such as endpoints of different police, fire or other security networks may present a challenge. Collaboration between the different agencies and networks tends to be ad hoc and inefficient. When achieved, it often involves laborious manual intervention. Organizations working towards interoperability solutions include Raytheon JPS Communications, IP Blue, Twisted Pair, M/A-COM, Motorola, EADS, and Cisco Systems.

Once interoperability has been achieved it may allow a user to monitor several different groups using a single device. These groups may be arranged into virtual talk groups. The virtual talk groups may be comprised of endpoints communicating with one another using a common or a differing communication technology and/or channel. The communication technology that allows the user to monitor several different virtual talk groups may also be used to provide interoperable communication between different communication devices using different technology (e.g., cell phone or push to talk devices) and/or different channels (e.g., different frequencies).

Some of the monitored virtual talk groups may include high priority communications, while others may include more mundane communications. In large working environments (e.g., a cross-discipline emergency situation or a shipping yard) the user monitoring the virtual talk groups may not be able to readily identify a speaker by their voice or several communications may come in a single burst making it difficult to distinguish individual communications. In a situation in which the communication is a high priority communication, time spent checking each monitored virtual talk group to determine where a high priority communication came from can be costly. Furthermore, there may be instances in which the user monitoring the virtual talk groups needs to direct their attention to an alternate task. Then, when the user returns their attention to monitoring the virtual talk groups they may not be aware that a communication has occurred.

Many devices such as citizen band radios include an indicator light indicating when the radio is presently transmitting or receiving a signal on the currently tuned frequency. Some radios also provide alerts when a severe weather warning is issued on a channel other than the channel to which the radio is currently tuned. Other devices, such as power meters or local area network (LAN) activity LEDs, may include peak level indicators that may display the peak signal level detected for a certain amount of time.

SUMMARY

Particular embodiments provide a method and system for providing an indication of a communication that substantially eliminates or reduces at least some of the disadvantages and problems associated with previous methods and systems.

In accordance with a particular embodiment, a method for providing an indication of a communication includes facilitating communications between a plurality of endpoints within each of a plurality of virtual talk groups. The method also includes monitoring the communications between the plurality of endpoints within each of the plurality of virtual talk groups. The method further includes, upon detecting a first communication within a first virtual talk group of the plurality of virtual talk groups, activating a first indicator. The first indicator indicates the detection of the first communication. The method also includes, upon the occurrence of a first deactivating event, deactivating the first indicator.

In particular embodiments the first indicator is associated with the first virtual talk group and indicates the first virtual talk group as the source of the first communication. Some embodiments may further include, upon detecting a second communication within a second virtual talk group of the plurality of virtual talk groups, activating a second indicator associated with the second virtual talk group. The second indicator indicates the second virtual talk group as the source of the second communication.

Depending on the embodiment, the occurrence of the first deactivating event may include: receiving an acknowledgement from a user indicating the user is aware of the detected first communication; the expiration of a first amount of activation time or detecting a second communication within a second virtual talk group of the plurality of virtual talk groups. Where the occurrence of the first deactivating event includes detecting a second communication within a second virtual talk group the method may further include, upon detecting the second communication within the second virtual talk group, activating a second indicator. The second indicator may indicate the second communication detected was from the second virtual talk group.

In some embodiments the first indicator associated with the first virtual talk group may include an indicator selected from the group consisting of: an audible indicator, an illuminated indicator, an icon, a flashing indicator, and a decaying indicator.

In particular embodiments the deactivating the first indicator may include an action selected from the group consisting of: turning off the first indicator, changing the color of the first indicator, causing the first indicator to flash, causing the first indicator to remain solid, causing the first indicator to decay in brightness, and causing the first indicator to decay in size.

In accordance with another embodiment a system for providing an indication of a communication includes a processor operable to facilitate communications between a plurality of endpoints within each of a plurality of virtual talk groups. The system also includes an interface coupled to the processor. The interface is operable to monitor the communications between the plurality of endpoints within each of the plurality of virtual talk groups. The processor is further operable to, upon detecting a first communication within a first virtual talk group of the plurality of virtual talk groups, activate a first indicator. The first indicator indicates the detection of the first communication. The processor is also operable to, upon the occurrence of a first deactivating event, deactivate the first indicator.

Technical advantages of particular embodiments include systems and methods for providing an indication of a communication that allows for a user monitoring several virtual talk groups to more easily determine from which virtual talk group a communication originated. Accordingly, the user wastes less time tracking down the source of a particular communication. Another technical advantage of particular embodiments includes lingering indicators that alert a dispatcher of a previously detected communication. Accordingly, if the dispatcher is temporarily distracted and can not monitor the VTGs he may still be alerted to the occurrence of prior communications. Yet another technical advantage of particular embodiments includes multiple indicators. Accordingly, a user may be able to prioritize his response to prior communications based on which indicators have been activated.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments and their advantages, reference is now made to the following description, taken in conjunction with the accompanying drawings, in which.

DETAILED DESCRIPTION

Figure 1:
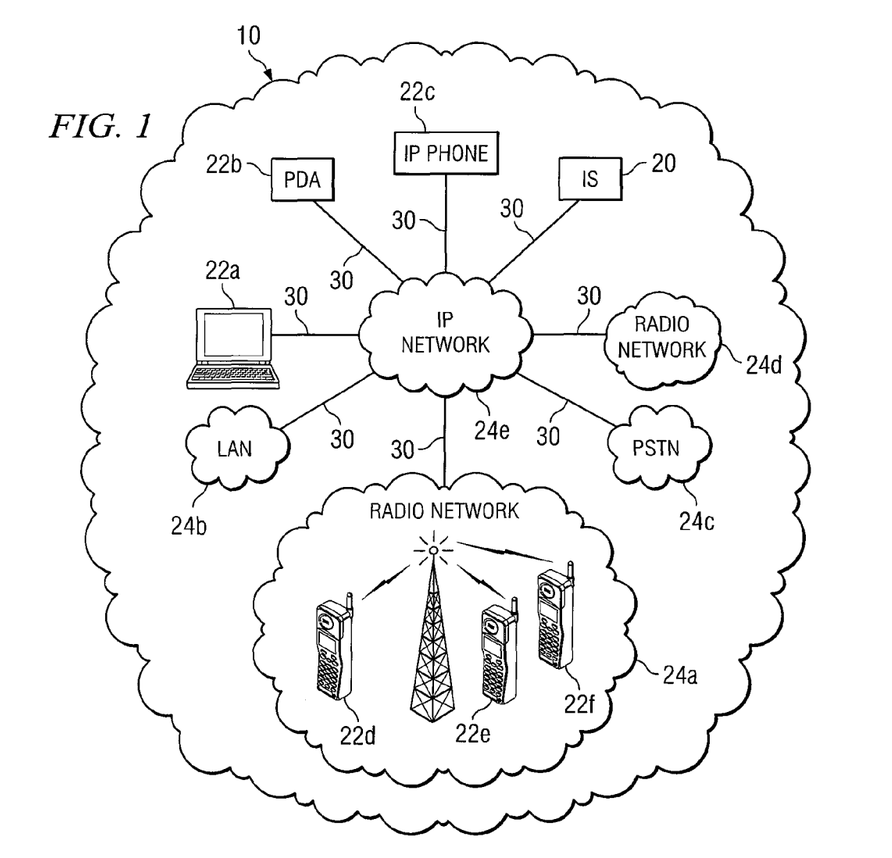
FIG. 1 illustrates a communication system with various communication networks and an interoperability system, in accordance with a particular embodiment.

FIG. 1 illustrates a communication system 10, in accordance with a particular embodiment. Communication system 10 includes communication networks 24a-24e, interoperability system (IS) 20 and endpoints 22a-22f. IS 20 is able to facilitate interoperable communication sessions between and among various communication devices, such as endpoints of communication networks 24 and endpoints 22. IS 20 uses a systems approach to offer a framework based on IP protocols and services to achieve secure voice, video and other data interoperability among communication endpoints and networks utilizing different technologies.

In particular embodiments, a virtual talk group (VTG) may be formed to allow endpoints from different communication networks to communicate with one another as though they were part of the same communication network. A VTG may be formed in response to a particular situation (e.g., a fire) or to allow communication between endpoints of different functional groups within a particular working environment (e.g., different groups within a seaport). Multiple VTGs may be monitored by a dispatcher, foremen, operator, commanding officer or any other suitable user. Such monitoring of multiple VTGs may be accomplished using a single monitoring device. The monitoring device may be a stationary device (e.g., a component of a control center) or it may be a mobile device (e.g., a laptop or mobile radio). The mobile device may be particularly useful when a dispatcher needs to be able to monitor several channels while being able to move around. By creating a VTG, the communications from the various other VTGs and/or endpoints may be rebroadcast over a single channel associated with the created VTG to which the dispatcher has previously tuned his radio.

Unfortunately, the attention of a dispatcher may occasionally be diverted by other tasks, or they may receive several communications in rapid succession. This may cause the dispatcher to miss a communication or hinder their ability to promptly identify the source of the communication. To aid these dispatchers in their job, different embodiments provide different types of lingering indicators that may alert the dispatcher that a prior communication has been detected and, in some embodiments, from which VTG the communication originated. Depending on the operational needs of the dispatcher the lingering indication may allow the dispatcher to quickly identify information such as which VTG last transmitted a communication, which VTGs have sent communications, how long ago the communication was sent, how many communications were sent, the general order in which communications were sent from different VTGs, some combination of the above, or any other information that may be useful.

In the illustrated embodiment, communication networks 24a and 24d comprise radio networks (RNs), communication network 24b comprises a local area network (LAN), communication network 24c comprises a PSTN and communication network 24e comprises an IP network. It should be understood, however, that communication system 10 may comprise any number of IP or non-IP communication networks of any wireless or wireline form capable of communicating audio and/or video telecommunication signals, data, and/or messages, including signals, data or messages.

Communication networks 24a-24e may include any number and combination of segments, nodes and endpoints to enable communication among network devices and components. Communication networks 24a-24e may be distributed locally or across multiple cities and geographic regions. Communication system 10 (including IS 20) may include any suitable number, type and/or combination of network components, gatekeepers, call managers, conference bridges, routers, hubs, switches, gateways (e.g., LMR and PSTN gateways), servers (e.g., multipoint conference servers), base stations, endpoints, firewalls, access points, processors, memory or other hardware, software or encoded logic to provide functionality described herein such as implementing any number of communication protocols that allow for the exchange of data in communication system 10.

Segments 30, which may comprise any suitable wireless or wireline communication links, including one or more communication networks (e.g., WANs) as appropriate, may couple various networks with each other and with endpoints 22 and IS 20. In particular embodiments, segments 30 may include gateways for facilitating communication between various networks, such as a land mobile radio (LMR) gateway between radio network 24a and IP network 24e.

In some cases, users of endpoints of one of communication networks 24a-24e may communicate with endpoints of another of communication networks 24a-24e through IS 20. IS 20 may facilitate the communication between endpoints of different networks by itself rebroadcasting the communications of one network to another network or IS 20 may cause other components which it can control to rebroadcast the communication. A radio network, such as radio network 24a or 24d, may support communication among portable mobile station endpoints, such as LMRs, using any suitable communication methods or features, such as cellular and push-to-talk (PTT). Communication networks 24a-24e may comprise networks of particular groups or agencies (e.g., a municipality's police department network), whether operational with respect to a particular area or otherwise.

IS 20 enables, facilitates and/or provides for interoperable communication among communication endpoints and devices, such as LMRs, cellular phones, IP phones, PCs, PDAs, PSTN phones, video monitors, cameras and sensors of one or more communication networks (e.g., communication networks 24*a*-24*e*) using Internet Protocol. Such endpoints may comprise IP or non-IP-enabled endpoints. In particular embodiments, IS 20 may control gateways (for example, of segments 30) in order to map radio frequencies of particular mobile radio endpoints to IP addresses for communication to other types of radio endpoints or IP devices. For example, a particular gateway may be able to receive communications from various types of endpoints (e.g., on various types of communication networks) and may convert such communications for transmission to other types of endpoints. IS 20's control of the gateway may control the various endpoints and/or networks that receive particular communications, depending on system functionality and configuration as further discussed below. Such control may include the mapping of communications and endpoints to IP addresses for interoperable communication. In some embodiments, IS 20 may be viewed as a logical aggregation of functions that may be distributed throughout communication system 10. In some embodiments, IS 20 may host audio conferences that bridge communications received from endpoints. IS is coupled to communication networks 24*a*-24*d* and endpoints 22 through IP network 24*e*, which may comprise any suitable IP network.

As indicated above, IS 20 uses IP to enable communication among endpoints of various networks. The endpoints of these various networks may not (without the aid of IS 20) normally be able to communicate with one another. The manner in which IS 20 facilitates communications among these endpoints may vary according to location and system or operational needs. For example, IS 20 may communicate with endpoints using multicast IP addresses assigned to an endpoint of a communication network, a group of endpoints of a communication network or one or more endpoints of multiple communication networks or alternatively using a peer to peer dialed connection or a nailed dialed connection. A group of endpoints may be combined into a VTG for communication using a particular IP address. As an example, the VTG may be assigned a multicast IP address through which users of various endpoints may communicate on the VTG. The use of multicast IP addresses allows IS 20 to facilitate communications among communication devices and endpoints of various communication networks to provide audio, data, video and control network interoperability. As an additional example, in some cases multicast streams (e.g., utilizing multicast IP addresses) may be used. In some cases nailed dialed connections, such as those using SIP protocol, may be used for communication among endpoints and with IS 20. Various embodiments may combine communication methods to facilitate communication among endpoints. For example, in some cases certain endpoints of a virtual talk group may participate in the talk group through a multicast IP address while other endpoints may utilize a nailed SIP connection. Unless otherwise noted, participating in a VTG may include being able to both transmit and receive communications. IS 20 may control participation, for example, by controlling gateways, multipoint conferences and the mapping of communications to IP addresses.

IS 20 may be utilized and implemented in any number of market segments, such as enterprise safety and security (e.g., loss prevention), transportation, retail, public safety and federal agencies in order to provide radio and non-radio network interoperability within and between such market segments. As indicated above, such network interoperability includes the interoperability of push-to-talk voice technology within various networks and the interoperability between push-to-talk and full duplex dialed connections.

It should be noted that endpoints 22 and IS 20 may be any combination of hardware, software, and/or encoded logic that provides communication services to a user. In the illustrated embodiment, endpoints 22 comprise a PC (endpoint 22*a*), a personal data assistant (PDA) (endpoint 22*b*), an IP phone (endpoint 22*c*) and several PTT LMRs (endpoints 22*d*-22*f*). However, in other embodiments, endpoints 22 may include a telephone, a video monitor, a camera, a cell phone, a command center or any other communication hardware, software and/or encoded logic that supports the communication of audio, video or other data, using packets of media (or frames) or otherwise, through communication system 10. Endpoints 22 as well as endpoints and components of communication networks 24 may be capable of communicating using any particular type of technology, such as cellular, IP, PSTN, CDMA, GSM, TDMA and satellite. Endpoints 22 and IS 20 may also include unattended or automated systems, gateways, other intermediate components or other devices that can establish media sessions.

Although the illustrated embodiment includes five communication networks 24*a*-24*e*, the term "communication network" should be interpreted as generally defining any network capable of transmitting audio and/or video telecommunication signals, data, and/or messages, including signals, data or messages. Any one of networks 24*a*-24*e* may be implemented as a local area network (LAN), wide area network (WAN), cellular network, global distributed network such as the Internet, Intranet, Extranet, PSTN, LMR network, radio network (RN), CDMA network, GSM network, TDMA network, satellite network or any other form of wireless or wireline communication network.

Communications over communication networks 24*a*-24*e* may use any suitable communication protocol. In particular embodiments, some communication networks may employ voice communication protocols that allow for the addressing or identification of endpoints, nodes, and/or other components coupled to the communication network. For example, using Internet protocol (IP), each of the components coupled together by, for example, communication network 24*b* in communication system 10 may be identified in information directed using IP addresses. In this manner, network 24*b* may support any form and/or combination of point-to-point, multicast, unicast, or other techniques for exchanging media packets among components in communication system 10. Any network components capable of exchanging audio, video, or other data are included within the scope of the present invention.

Since IP networks share a common method of transmitting data, telecommunication signals may be transmitted between telephony devices located on different, but interconnected, IP networks. In addition to being coupled to other IP networks, communication network 24*b* may also be coupled to non-IP telecommunication networks, for example through the use of interfaces or components, including gateways. In the illustrated embodiment, communication network 24*b* may be coupled with PSTN 24*c* through a gateway. In some embodiments the gateway may be a part of IS 20 or network 24*e*. PSTN 24*c* includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 24c), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, one or more of endpoints 22a-22c, and endpoints and components of communication networks 24 may be IP telephony devices capable of participating in IM, video, and other multimedia communication sessions. IP telephony devices have the ability of encapsulating a user's voice (or other input such as video or IM) into IP packets so that the voice can be transmitted over a communication network. IP telephony devices may include telephones, fax machines, computers running telephony software, nodes, gateways, wired or wireless devices, hand held PDAs, or any other device capable of performing telephony functions over an IP network.

In particular embodiments, communication system 10 may receive and transmit data in a session initiation protocol (SIP) environment. SIP is an application-layer control protocol that includes primitives for establishing, modifying and terminating communication sessions. SIP works independently of underlying transport protocols and without dependency on the type of session that is being established. SIP also transparently supports name mapping and redirection services, which support personal mobility.

Although FIG. 1 illustrates a particular number and configuration of endpoints, IS and communication networks, communication system 10 contemplates any number or arrangement of such components for communicating media.

Figure 2:
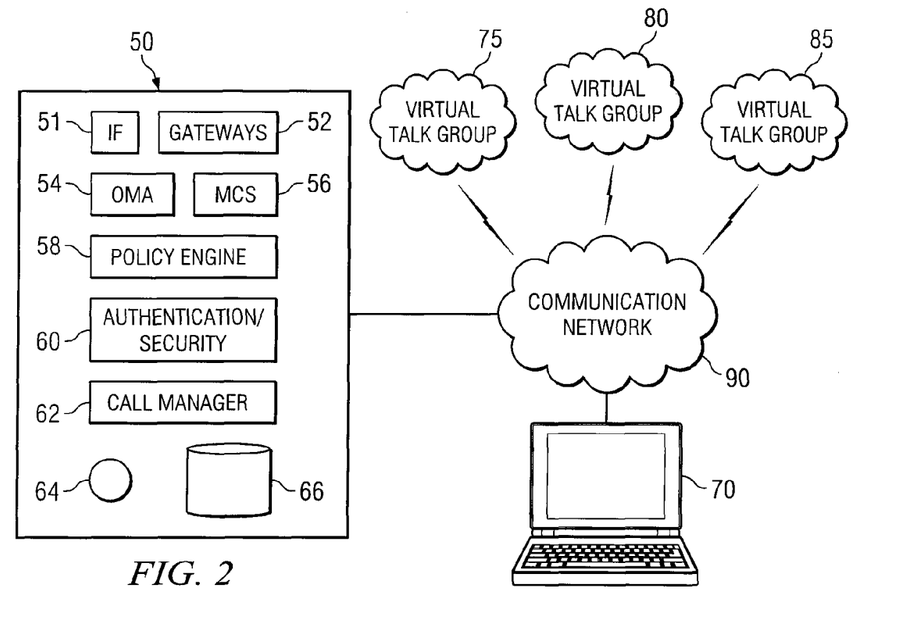
FIG. 2 illustrates an example interoperability system, in accordance with a particular embodiment.

FIG. 2 illustrates interoperability system (IS) 50, in accordance with a particular embodiment. IS 50 may be similar to and provide similar functionality as IS 20 of FIG. 1. In the illustrated embodiment, IS 50 includes interface 51, gateways 52, operations management application (OMA) 54, multipoint conference system (MCS) 56, policy engine 58, authentication and security system 60, call manager 62, processor 64 and memory module 66. In some embodiments IS 50 may be viewed as a logical aggregation of functions that may be distributed throughout communication network 90. IS 50 is coupled to PC endpoint 70 and VTGs 75, 80, and 85 via communication network 90. VTGs 75, 80, and 85 may comprise any number of endpoints utilizing any type of communication technology and/or channel. Communication network 90 may include one or more of communication networks 24 depicted in FIG. 1. PC endpoint 70 may be used to access, configure and control various functionality provided by IS 50. PC endpoint 70 may run a client application for such access, configuration and control. The client application may enable a user of endpoint 70 to receive and monitor communications from various endpoints and virtual talk groups. In some embodiments, when a communication is detected from a particular VTG, PC endpoint 70 may display an indicator alerting the user that a prior communication from the particular VTG has been detected. The indicator may be maintained until any of a variety of status changing events occur. For example, the PC endpoint 70 may maintain the indicator until a fixed amount of time has elapsed or until the detected communication has been acknowledged by the user. In particular embodiments, other types of endpoints may be utilized to access, configure and control IS 50, such as IP phones, web based thin clients, PDAs and mobile devices. IS 50 may be coupled to such endpoints (including PC endpoint 70) through one or more communication networks. Similarly, other endpoints, such as LMRs, may have components, such as LEDs, that may be used to provide an indication of a prior communication.

Interface 51 may be used in the communication of audio, video, signaling and other data between IS 50 and other network components. For example, interface 51 may receive communications from endpoints such as any of the endpoints of VTGs 75, 80 or 85 of communication network 90. The communication may take place, in whole or in part, over IP networks thereby negating the need for dedicated wiring between the endpoints and IS 50.

Gateways 52 may include any suitable gateways to provide network interoperability and back-end legacy application integration, such as LMR gateways, PSTN gateways and application gateways. Gateways 52 provide mapping between IP services and the interoperable networks, such as LMR network 24a of FIG. 1. In some cases gateways 52 may not be located within an IS but may be distributed throughout a communication system for enabling communications among various communication networks.

Operations management application (OMA) 54 includes functionality for configuration, management and control of IS 50, including conference and collaboration management, and may be accessed by a user via, for example, PC endpoint 70. In particular embodiments, OMA 54 may enable a user, such as dispatch personnel or administrators or a mobile user (e.g., a first responder mobile user) accessing IS 50 via a mobile endpoint, to configure, manage and participate in one or more virtual talk groups simultaneously. In particular embodiments, OMA 54 may be accessed through a web interface, functioning for example as a soft phone for radios. A screen display may be controlled using a mouse, keypad, touch screen, voice commands or any other suitable interface. OMA 54 screen displays may include any number of functional controls to provide interoperable communications. In some embodiments, the screen displays may include listings or icons that may provide users with an indication that a prior communication has been detected. In particular embodiments, the dispatcher may be able to click on a particular listing or icon to communicate with the respective VTG. OMA 54 may authenticate a user and obtain user configuration information upon a user accessing the OMA. OMA 54 may monitor and provide communication ability for any number of channels and modalities at one time to provide the ability for an OMA user to communicate on and control multiple virtual talk groups at once.

Multipoint conference system (MCS) 56 provides collaboration and conference services for multiple endpoints of one or more networks. For example, users of multiple endpoints, such as LMRs of different networks (e.g., networks of different agencies or groups) and different types of endpoints of different networks, may be bridged together through MCS 56 to provide virtual talk group communications. In particular embodiments, multiple talk groups may be patched together on a dynamic, as needed basis. In some cases a virtual talk group may not necessarily include communications through an IS but may instead include member endpoints whose communications are mapped to IP addresses at gateways (such as LMR gateways) controlled by an IS. MCS 56 may include any suitable number or type of conference bridges, ports, digital signal processors or other components to facilitate communications discussed herein.

Policy engine 58 includes policies for undertaking various operations and functionality upon the occurrence of various events. These policies may include both pre-determined and ad hoc policies. For example, policy engine 58 may provide for different lingering indicators depending on the source of the detected communication, the relationship between different communications, the operator monitoring the plurality of VTGs and/or any settings or modes that may have been selected.

Authentication and security system 60 manages access, configuration and control privileges for users of IS 50 and those participating in interoperable communications. For example, different users may have different privileges assigned for interoperable communications. Some users may only have transmit or listen privileges with respect to one or more particular talk groups, while other users may have the ability to communicate in all talk groups or setup and configure various talk groups.

Call manager 62 maintains information regarding various users, such as users of IP networks for which interoperable communications are provided by IS 50. This facilitates in the extension of PTT to IP networks and in the provision of voice and data interoperability across radio and non-radio networks. In particular embodiments, call manager 62 may maintain a listing, table, or other organization of information about users. The information may include a name or other identifier and contact information such as phone numbers and email addresses for the users. In some embodiments, the information about users is maintained within other components coupled to call manager 62 through, for example, network 90 so that call manager 62 may use the network to access the information about users. In particular embodiments call manager 62 may represent any appropriate combination of hardware, software and/or encoded logic distributed throughout a communication network coupled with an IS.

Processor 64 may be a microprocessor, controller, or any other suitable computing device, resource, or combination of hardware, software and/or encoded logic operable to provide, either alone or in conjunction with other IS components such as OMA 54, IS 50 functionality. Such functionality may include providing various features discussed herein to a user, such as a user of an endpoint accessing IS 50 through OMA 54. Such features may include providing the user with lingering notifications that are tailored to his job function. For example, if the user is a warehouse manager monitoring several channels and who is repeatedly called away for other tasks processor 64 may provide him with a lingering indicator that slowly decays over time so that he can easily approximate the age of the previously received communication based on the size, color and/or brightness of the decaying indicator.

Memory module 66 may be any form of volatile or non-volatile memory including, without limitation, magnetic media, optical media, random access memory (RAM), read-only memory (ROM), removable media, or any other suitable local or remote memory component. Memory module 66 may store any suitable data or information, including software and encoded logic, utilized by IS 50. In some embodiments memory module 66 may store a database comprising provisions for different types of lingering indicators that may be used depending on the source of the detected communication and/or the dispatcher. Memory module 66 may also store any other data that may be useful in implementing any of the features of particular embodiments. For example, in some embodiments, memory module 66 may include data for user management, talk-group management, resource pool management, privileges, backup configuration and information and/or timestamp and activity tracking.

IS 50 may also include any number of switches, routers, firewalls, mobile access routers, access points, wireless bridges and other components in order to accommodate particular operational desires and needs.

In particular embodiments such as in the LMR network interoperability context, IS 50 may, through one or more components discussed above or through other components, encode received audio with a standard audio codec, such as G.711 or G.729. Those audio samples may be packaged in standards-based real-time transport protocol (RTP) or real-time transport control protocol (RTCP) packets suitable for transport on an IP network. At this point, the communication element may be abstracted from the distinctive characteristics of each radio system. These audio packets can be sent across the network to other radio systems either individually (unicast) or as a group (multicast). The recipient of the audio packets may be a device capable of receiving and decoding the RTP or RTCP stream, such as an IP telephone or PC with appropriate software. The IP network and IP-enabled devices can be used to allow endpoints to monitor or transmit on a particular radio channel from a desk without issuing another radio.

As indicated above, IS 50 may facilitate communication among endpoints of various networks through virtual channels or VTGs. For example, a channel may comprise a unidirectional or bidirectional path for transmitting and/or receiving electrical or electromagnetic signals. This may comprise, for example, a conventional radio physical RF channel. In some embodiments, a VTG may be a subgroup of users who share a common functional responsibility and typically coordinate their actions amongst themselves without communicative interaction with other subgroups. For example, a building's security force network may include various endpoints that do not usually require radio connectivity with other functional groups but who are in constant communication amongst themselves, whether by radio, telephone or other forms of electronic communication. In particular embodiments a VTG may represent interoperability of a group of channels, and may include an associated virtual channel and an ID. Virtual channels may comprise an address, such as an IP address, associated with a VTG through which users may access the VTG and/or through which communications from VTG member-endpoints are bridged. Various types of VTGs may be utilized in particular embodiments, such as a multicast address usable by all endpoints of the VTG, a VTG comprising multiple talk groups (e.g., multiple radio sources from different frequencies whose communications are mixed), a unicast group and a combination unicast and multicast group.

Any number of virtual talk groups may be configured to provide any suitable audio, data, video and control network interoperability. Virtual talk groups may be created using any suitable user/endpoint groups or channels based on location, organizational requirements, functional requirements, event requirements, or any other suitable characteristic. An administrator or operator may configure channel details such as name, description, participants, multicast IP addresses, codec and latch options through, for example, OMA 54.

As an example, a particular VTG may comprise any one or more of the following: (1) a channel or other multicast path used by certain users of a police department's radio network, (2) a channel or other multicast path used by certain users of a fire department's radio network, (3) a channel or other multicast path used by certain users of a corporation's security radio network and (4) a plurality of users of IP-enabled endpoints such as IP phones, IP-enabled PDAs or PCs. An operator of IS 50 may configure the virtual talk group using any suitable interface, such as by dragging and dropping the included channels and IP endpoints into a single area representing the virtual talk group. The VTG may also be configured by IS 50 through, for example, the use of OMA 54, policy engine 58, and processor 64, according to an organization's defined policies.

The following examples are presented to help in understanding the functionality of particular embodiments. For simplicity each example may combine only a few features together, though in practice particular embodiments may use some, all or none of the features in any of the examples discussed below. It should be noted that these examples are for illustrative purposes only and depict only some of the features and workings of particular embodiments. They are not intended to illustrate all features of all embodiments. Also, for simplicity the user that is monitoring the multiple VTGs will generally be referred to as a dispatcher, though as noted above, the user may be any type of user who needs to monitor multiple VTGs, such as a manager, foremen, officer, or operator.

As indicated above, particular embodiments may provide a dispatcher with a lingering indication of previously detected communications that may alert a distracted user of the prior communication and possibly its source. The indication may be of any form, whether visual or audible, sufficient to alert a user that a prior communication has been detected. Some embodiments may use fixed length indicators that linger for a certain amount of time after a previously detected communication. This type of lingering indicator may be advantageous in situations where the user's attention may only be diverted for a relatively short period of time, where a relatively small number of VTGs are being monitored and/or where there may only be a relatively small number of communications. The amount of time for which the indicator may linger may be predetermined or it may be configured by, for example, the dispatcher using the fixed length indicator or by the organization for which the dispatcher works.

Depending on the embodiment, the characteristics (e.g., color, shape, duration, source) of the fixed length indicator may vary substantially. For example, on a mobile unit, such as an LMR, the fixed length indicator may comprise an LED that illuminates for a fixed amount of time. In some embodiments an LED that is used when transmitting or receiving a communication may also be used to indicate detecting a previous communication. For example, the LED may be red when transmitting a communication, green when receiving a communication, and yellow for a fixed amount of time after detecting a prior communication. In particular embodiments, a single LED may be used while other embodiments may use multiple LEDs. Multiple LEDs may allow individual LEDs to be associated with particular VTGs. This may allow the user to get a better idea as to the VTG source of the missed communication based on which LED is illuminated. In some embodiments the LED/LEDs may be controlled by some combination of processor 64, memory 66, policy engine 58 and interface 51. Some embodiments may use a device, such as a computer (e.g. PC endpoint 70), that includes a screen that is capable of displaying text and/or icons. In such embodiments the fixed length indicator may comprise an icon that appears on the screen for a fixed amount of time. Each VTG may have its own fixed length indicator, or some or all of the VTGs may share one or more fixed length indicators.

Whether the lingering indicator is presented as an icon on a screen, an LED on a mobile device or in any other appropriate manner based on the endpoint, it may be combined with an automated response. The automated response may allow a user to respond to the last detected communication by simply pressing a button. For example, suppose a user of PC endpoint 70 is monitoring VTGs 75, 80, and 85 but only has a single lingering indicator. At some point the user's attention may temporarily be diverted by another task. When he returns, the lingering indicator may be illuminated, indicating that he missed a communication, but he does not know from which of the three VTGs the communication came. The automated response feature may store, for example within memory 66, information associated with the last detected communication. The information may then be retrieved and processed, for example by processor 64, so that when the dispatcher presses a talk button (or a special talk button reserved for automated responses) his endpoint sends his communication to the VTG that last transmitted a communication. Without the automated response or a lingering indicator able to distinguish between VTGs the user may have to use trial and error to go through each VTG one at a time and ask if they just transmitted a communication.

Particular embodiments may use an indefinite length indicator that may comprise an LED or icon that, once activated, remains active until the communication that triggered the lingering indicator has been acknowledged. Depending on the embodiment, the indefinite length indicator may be acknowledged in a variety of different ways. For example, in some embodiments the indefinite length indicator may be acknowledged when the dispatcher responds to the communication by transmitting a communication to the same VTG that triggered the indicator. In particular embodiments, there may be a separate button or switch that may be toggled to acknowledge the prior communication. In some embodiments the communication may be acknowledged whenever the dispatcher transmits a communication, regardless of the VTG to which it is sent.

Because the indefinite length indicator persists until it is acknowledged this type of indicator may be useful in situations in which the dispatcher's attention may be diverted for varying lengths of time. More specifically, because of the varying length of time it might not be possible and/or efficient to set a fixed amount of time to be used as is done with a fixed length indicator.

Some embodiments may allow the dispatcher to activate an "Away" mode. Activating the "Away" mode may work to provide IS 50 with a notification that the dispatcher's attention is going to be diverted and that IS 50 should either begin to monitor the VTGs and activate an indicator for any detected communications or it should change the type of indication that is used. For example, if IS 50 is using a fixed length indicator when the dispatcher activates the "Away" mode, policy engine 58 may be configured to switch to an indefinite length indicator. This may allow the dispatcher to be away for as long as he likes without having to worry about the indicator turning itself off after a fixed amount of time (before he is able to check it).

Particular embodiments may include a counter along with a lingering indicator, such as an indefinite length indicator. The counter may display any of a number of different events detected by IS 50 via, for example interface 51, memory 66, processor 64, and policy engine 58. For example, in some embodiments the counter may display the number of communications that occur between acknowledgements. In an embodiment that uses multiple lingering indicators and multiple counters this may allow the dispatcher to quickly identify the relative respective traffic levels of the various VTGs. As another example, the counter may be a timer that displays the amount of time since the last detected communication. IS 50 may start timing at the start or end of the communication. This may allow the dispatcher to be able to quickly determine just how old the last communication is. Yet another example may be a timer that tracks the length of each prior communication. This may allow the dispatcher to be able to identify the length of the communications within a particular VTG.

Some embodiments may use an exclusive indicator in which only the indicator associated with the last VTG to communicate is active. This type of indicator may be used in those embodiments that have more than one indicator, or an indicator that can have different colors. In particular embodiments IS 50 may activate, enable, or illuminate the indicator associated with the VTG from which the most recent communication was detected. This can be seen in a simple example—if an endpoint within VTG 75 talks first, the indicator associated with VTG 75 would activate, then if an endpoint within VTG 85 speaks the indicator associated with VTG 85 would activate while the indicator associated with VTG 75 would deactivate. The type of activation/deactivation used may reflect the physical characteristics of the indicator. For example, where the indicator comprises multiple LEDs, activation may involve turning the appropriate LED on and deactivation may involve turning the appropriate LED off; where the indicator comprises a single LED that is able to change color, activation may involve causing the LED to emit a particular color and deactivation may involve causing the LED to stop emitting that particular color (this may involve turning the LED off or changing its color); where the indicator comprises computer icons, activation may involve displaying an icon having a particular color, shape, or style and deactivation may involve changing the color, shape, or style of the icon or removing the appropriate icon from the screen.

In those embodiments that have multiple indicators that can also change color, it may be advantageous to combine an exclusive indicator with an indefinite or fixed length indicator. For example, the exclusive indicator may be associated with one color while the indefinite type indicator may be associated with a different color. More specifically, some embodiments may use two colors, with one color indicating the most recent communication and the other color indicating the other VTGs in which a previous communication was detected. This can best be seen by an example. If an endpoint within VTG 75 transmits the first communication then the indicator associated with VTG 75 may be activated so as to emit a blue light, while the indicators associated with VTGs 80 and 85 may remain deactivated. Then, if an endpoint associated with VTG 80 transmits a communication the blue indicator associated with VTG 75 may be deactivated and a yellow indicator may be activated, the indicator associated with VTG 80 may be activated so as to emit a blue light, and the indicator associated with VTG 85 may remain deactivated. Then, if an endpoint associated with VTG 85 transmits a communication the indicator associated VTG 75 may remain yellow, the blue indicator associated with endpoint 80 may be deactivated and a yellow indicator may be activated, and the indicator associated with VTG 85 may be activated so as to emit a blue light. This may allow the dispatcher to tell that there has been communications within VTGs 75, 80, and 85 and that the last VTG to transmit a communication was VTG 85. It should be noted that in some embodiments the blue indicator and the yellow indicator may comprise the same source that changes colors, and in particular embodiments the blue and yellow indicators may comprise separate sources. As another example, some embodiments may use more colors, with each color being associated with a particular order. For example, a blue indicator may be associated with the most recent communication, a green indicator may be associated with the second most recent communication, a red indicator may be associated with the third most recent communication, and so on for as many colors, icons and/or levels of order that may be desired.

Some embodiments may use a decaying indicator that decreases in size, color, and/or brightness as time elapses. The indicator may start to decay when the communication is first detected, when the communication finishes or some time after either of the two events. This may allow the dispatcher to get an idea of how old the missed communication is by the size, color, and/or brightness of the decaying indicator. Some embodiments may include only one decaying indicator while other embodiments may use multiple decaying indicators. The type of indicator (e.g., initial size and color, shape) and the decay rate may be controlled by, for example, processor 64.

Figure 3:
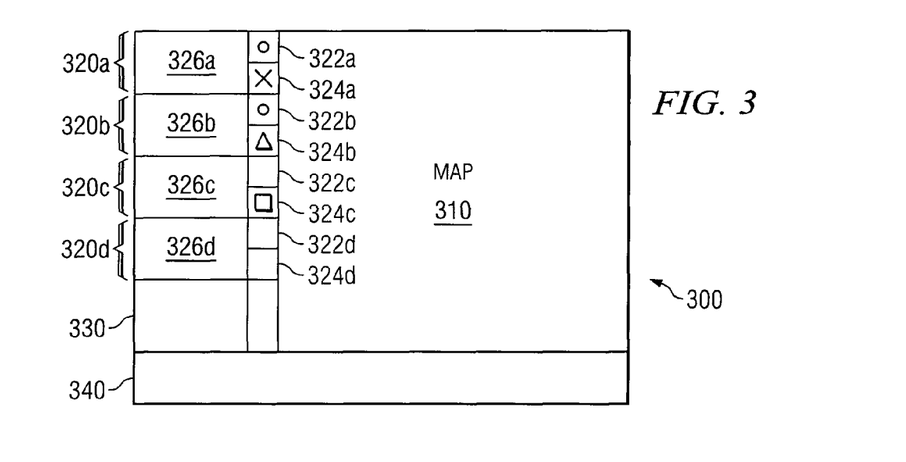
FIG. 3 illustrates an example interface of an interoperability system with indicators for a plurality of virtual talk groups, in accordance with a particular embodiment.

Some embodiments, such as the one depicted in more detail in FIG. 3, may include a monitor or screen that is able to display text. These embodiments may use a list indicator that maintains a list of prior communications. In some embodiments the list may be ordered chronologically. The list may be color/style coordinated to match with any other indicators that may be in use. For example, where the IS uses different colored LEDs for different VTGs, the VTGs listed in the list maintained by the list indicator may be similarly colored to match the coloring of the respective LED. IS may populate the list via some combination of interface 51, memory 66, MCS 56, policy engine 58, and processor 64 and it may maintain the data associated with the list within, for example, memory 66. In some embodiments the entire list may be cleared once the dispatcher responds to one of the communications listed by the list indicator. In particular embodiments, the dispatcher may remove those listed communications associated with a particular VTG once he has transmitted a communication to that VTG. Some embodiments may allow the dispatcher to simply click or double click on an entry within the list to begin transmitting a communication to the VTG.

Particular embodiments may use an audible indicator that may alert the dispatcher of a detected communication. In some embodiments this may be triggered by the dispatcher turning the main volume down or turning the volume associated with a particular VTG down (the audible indicator may maintain its volume separate from the main volume or any particular VTG's volume). This may be used with one of the above described visual indicators as a way to alert the dispatcher that he needs to check the visual indicators because a communication has been detected. Some embodiments may allow the dispatcher to customize/alter the sound or type of audible noise that is used and/or may allow the dispatcher to control the volume of the audible indicator. Some embodiments may allow for each VTG to have its own unique audible sound, thereby making it easier to identify the source of the communication.

Thus far many different embodiments and features have been presented. Particular embodiments may combine one or more of these features depending on operational needs and/or component limitations. This allows for great adaptability of IS 50 to the needs of various organizations and users. For example, a particular embodiment may use indefinite indicators for certain high priority VTGs and fixed length indicators for the remaining lower priority VTGs.

FIG. 3 illustrates an example interface of an interoperability system with indicators for a plurality of virtual talk groups, in accordance with a particular embodiment. Display 300, as depicted in FIG. 3, comprises four sections, map section 310, VTG listings 320, alert listings 330, and data section 340. Display 300 is merely one example display screen. The actual configuration and arrangement of display 300 may be as varied as the uses to which it may be applied. For example, on a mobile unit display 300 may only include VTG listings 320.

In some embodiments each section may have its own window that the dispatcher may be able to arrange on the screen as they desire. Display 300 may be used with any device, using any of the communication technologies or protocols described above with respect to FIG. 1 or 2, which comprises a screen capable of displaying text and/or icons. For example, display 300 may be used with PC endpoint 70 of FIG. 2.

Map section 310 may provide a dispatcher with an overview of a particular area, such as the area to which she is assigned. In some embodiments, endpoints within a VTG may be able to transmit their location. This may allow map section 310 to display the locations of those endpoints that broadcast their position. Data section 340 may provide an area for any additional information that may be desired. For example, data section 340 may display a log of events, or actions taken by the dispatcher. Alert listing 330 may comprise a listing of past communications that have been detected. The list displayed in alert listing 330 may be populated chronologically, where the entry at the top of the list represents the most recent communication. In particular embodiments, the list may include unique identifiers for each VTG being monitored. More specifically, each VTG may have a unique color and/or icon associated with it, these identifiers may then be incorporated into each entry that appears on the list in alert listing 330.

Each VTG listing 320 may comprise a plurality of individual VTG sections. More specifically, each VTG listing 320 may comprise VTG info section 326, activity section 322, and indicator section 324. Other embodiments may have all, some, or none of these sections, and/or may include additional sections not depicted here in FIG. 3. Furthermore, the arrangement of the various sections of each VTG listing 320 may be rearranged to suit individual operational needs. In particular embodiments, each VTG listing 320 may be associated with a different VTG. This may allow each VTG listing 320 to display information that is specific to a particular VTG. Each of the sections of each VTG listing 320 may provide the dispatcher with a specific piece of information in a quick, easy to decipher, visual format.

Examining some of the possible sections of VTG listing 320 in more detail, VTG info section 326 may provide detailed information about the VTG with which it is associated. The information displayed within VTG info section 326 may include such information as a quickname or nickname associated with the VTG, a listing of the members of the VTG and/or a brief description of the function of the VTG. Activity section 322 may provide an indication of when there is a communication currently being received from the respective VTG. Indicator section 324 may provide a lingering indication that a prior communication from the respective VTG has been detected.

FIG. 3 depicts display 300 at a particular moment in time. To best describe the situation at this moment in time assume that VTG listing 320a is associated with VTG A, that VTG listing 320b is associated with VTG B, that VTG listing 320c is associated with VTG C, and that VTG listing 320d is associated with VTG D. Were a dispatcher to look at display 300 she may be able to quickly determine that the two people she is currently listening to are from the VTG A and VTG B because activity indicators 322a and 322b, respectively, are active. Furthermore, the dispatcher may be able to quickly identify that VTG A, VTG B and VTG C have all had prior communications because the lingering indicator displayed in indicator sections 324a, 324b and 324c, respectively, is active.

Furthermore, in this embodiment the dispatcher may be able to identify the relative order of the prior communications because each of the uniquely shaped icons in indicator section 324 may be associated with a particular order. More specifically, in this embodiment, the "X" shaped icon in indicator section 324a may indicate the most recent communication, the triangle shaped icon in indicator section 324b may indicate the second most recent communication, and the square shaped icon in indicator section 324c may indicate the third most recent communication. In some embodiments, the icon in indicator sections 324 may be similar, and a number, letter or color may be used to distinguish their relative order. More specifically, instead of using an "X," a triangle, and a square, each icon may be a square with a 1 inside the square in indicator section 324a, a 2 inside the square in indicator section 324b, and a 3 inside the square in indicator section 324c.

In some embodiments, each of the uniquely shaped icons within indicator sections 324 may be associated with a VTG as opposed to the order in which the communications were detected. More specifically, each VTG may have a uniquely shaped icon associated with it that may allow the dispatcher to identify the appropriate VTG by the shape of the icon. The uniquely shaped icons may also be used with map section 310 (e.g., map section 310 may show the location of an endpoint using the endpoint's respective VTG icon). In particular embodiments the shape of the icon may also be coordinated with similarly shaped icons used in conjunction with the entries displayed in alert listing 330. This may allow the dispatcher to identify which VTGs have spoken with a quick glance at alert listing 320 without having to read each of the entries to determine which VTG is associated with the entry.

In some embodiments display 300 may be able to display different colors. Accordingly, these embodiments may take advantage of the color capabilities of display 300 by using different colors to indicate the order in which the communications were received or by associating different colors with particular VTGs. This may provide similar benefits as discussed above with respect to the use of icons. Furthermore, some embodiments may combine both the unique color and icon thus allowing a dispatcher to be able to identify the specific VTG as well as its respective order by simply looking at indicator section 324 or at an entry in alert listing 330 and identifying the shape and color of the lingering indicator.

Figure 4:
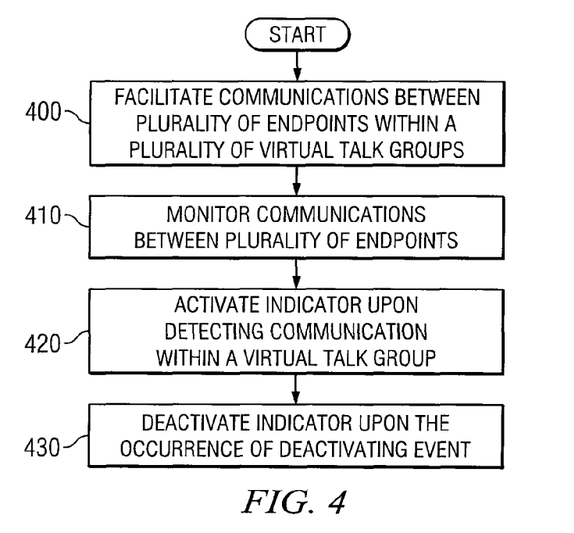
FIG. 4 illustrates a method for providing an indication of a communication, in accordance with a particular embodiment.

FIG. 4 illustrates a method for providing an indication of a communication, in accordance with a particular embodiment. The illustrated method allows, among other things, for a user monitoring several virtual talk groups (VTGs) to be able to identify the source or occurrence of a past communication even when their attention is temporarily diverted. The method begins at step 400 where an IS may facilitate the transmission and receipt of communications between a plurality of endpoints within each of a plurality of virtual talk groups. One or more users, such as a dispatcher, foremen, operator, or any other suitable user, may be responsible for monitoring, observing, or directing the endpoints within the plurality of VTGs.

The users within a particular VTG may be associated with a particular profession, (e.g., local police or airport security), function, (e.g., loaders, packers) or any other appropriate grouping. The endpoints within a VTG may use the same or different communication channels; different communication channels may include different communication technologies, such as plain old telephones or LMRs, or the same communication technology, for example LMRs using different frequencies. In particular embodiments, at least some of the endpoints may communicate through PTT technology. In addition, some of the endpoints may comprise IP endpoints.

In facilitating communications between the various endpoints the IS may also, at step 410, monitor the communications between the plurality of endpoints within each of the plurality of virtual talk groups. In monitoring the various communications the IS may simply note if a communication is sent by any of the endpoints it is monitoring, or it may note additional details about the communication, such as the source VTG from which the communication originated. The IS may monitor the communications regardless of whether or not the user monitoring the VTGs is paying attention.

At step 420, upon detecting a communication within one of the plurality of virtual talk groups, the IS may activate an indicator indicating the detection of the communication. In particular embodiments, the indicator that is activated may be uniquely associated with the source VTG from which the detected communication originated. In some embodiments multiple VTGs may be associated with the same indicator. Furthermore, some embodiments may combine multiple types of indicators, such as a visual and an audible indicator.

The type of indicator that is used may vary greatly from one embodiment to the next. To help illustrate the wide variety of indicators that may be used a few examples will be presented. These examples are not intended to be an exhaustive list, but merely are to demonstrate the variety of indicators that may be used within the scope of particular embodiments. One such indicator may be an audible indicator that may comprise a chirp, beep, ring tone, or some other sound that alerts the user of a detected communication. Some embodiments may allow the user to customize the sound that is played as part of the audible indicator. Depending on the embodiment, the volume of the audible indicator may be related to or independent of the volume of the device the user is using to monitor the communications.

Particular embodiments may use a simple LED located on, for example, a LMR, such as endpoints 22*d*-22*f* of FIG. 1, as an indicator. The LED may illuminate when a communication is detected, or it may illuminate in a particular color based on the source VTG of the detected communication. Some embodiments may have multiple LEDs with different VTGs being assigned to different LEDs. This may help a user narrow down which VTG was the source of the communication.

Some embodiments may use an icon presented on a display, such as the monitor of a PC (e.g., PC endpoint 70 of FIG. 2), or the screen of a PDA. There may be a single icon used for all VTGs, or unique icons for each VTG. Besides the shape of the icons, the color of the icons may also be different so as to help distinguish between the various VTGs being monitored by the IS. Both LED type indicators and icon type indicators may flash, remain solid or decay over a period of time. An indicator that decays may begin bright and then decay into darkness, or it may begin a bright color and then decay towards a dark color (e.g., sky blue to navy blue).

In particular embodiments the indicator may include a counter or timer. The counter may keep track of the number of communications detected within a particular VTG, within all the VTGs being monitored by the IS, or some smaller portion of all the VTGs being monitored by the IS (e.g., an IS that is monitoring 12 VTGs for 2 different users may use two counters with each counter tracking the number of communications within the VTGs assigned to a particular user). The timer may be started at the beginning or end of a communication. Furthermore, in some embodiments, it may be reset each time a new communication is detected. In particular embodiments the timer may measure the total duration of all the communications that have been detected. This may be done by running the timer whenever a communication is being transmitted.

Regardless of the type of indicator used, it may remain active until a first deactivating event occurs, at which point the indicator may be deactivated, as shown in step 430. Deactivating a particular indicator does not necessarily mean that the indicator is turned off; it may mean that the indicator has changed colors or locations. For example, in some embodiments where different colors are used to indicate different VTGs, deactivating a particular indicator may mean changing it from the color associated with a first VTG to the color associated with a second VTG.

Like the type of indicator, there is a wide variety of events that may constitute a deactivating event. Also, just as different types of indicators may be combined so too may different types of deactivating events be combined.

In some embodiment the deactivating event may comprise the passage of time. More specifically, the indicator may be activated upon detecting a communication and then after the passage of a fixed amount of time the indicator may be deactivated. In particular embodiments the deactivating event may include detecting a second communication. The second communication may be from the same or a different VTG as the first communication. For example, where a timer is used for a particular VTG, each time a new communication is detected within that VTG the timer associated with the previous communication may be deactivated and a new timer may be started for the new communication. As another example, if the first communication is from a first VTG and the second communication is from a second VTG, then when the second communication is detected the indicator associated with the first VTG may be deactivated while the indicator associated with the second VTG may be activated. As mentioned above, this may involve turning the indicator on/off or changing the color/style/shape of the indicator. For example, some embodiments may use an exclusive indicator that only turns on (e.g., emitting light or sound, or displayed on a screen) the indicator associated with the VTG that most recently transmitted a communication. In such an embodiment, upon detecting the second communication the first indicator may be turned off while the second indicator may be turned on. As another example, some embodiments may use color to indicate the relative order of the detected communications. In such an embodiment, upon detecting the second communication the first indicator may be changed to the color associated with the second most recent communication and the second indicator may display the color associated with the most recent communication.

In some embodiments, the deactivating event may include receiving an acknowledgement from the user indicating the user is aware of the detected communication. In some embodiments, this may involve the user pressing a dedicated "Acknowledge" button or soft-key on the device the user is using to monitor the communications. In particular embodiments, the acknowledgement may be based on the user indicating a desire to send a communication. For example, where the user is using an LMR, when he presses a "Talk" button the indicator/indicators for the previously detected communication/communications may be deactivated.

Some of the steps illustrated in FIG. 4 may be combined, modified or deleted where appropriate, and additional steps may also be added to the flowchart. Additionally, steps may be performed in any suitable order without departing from the scope of the invention.

While various implementations and features are discussed with respect to multiple embodiments, it should be understood that such implementations and features may be combined in various embodiments. For example, features and functionality discussed with respect to a particular figure, such as FIGS. 2 and 3, may be used in connection with features and functionality discussed with respect to another such figure, such as FIG. 1, according to operational needs or desires.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 10 and illustrated endpoints and interoperability systems, these elements may be combined, rearranged or positioned in order to accommodate particular routing architectures or needs. In addition, any of these elements may be provided as separate external components to communication system 10 and illustrated endpoints and interoperability systems, or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for providing an indication of a communication, comprising:
    facilitating communications between a plurality of endpoints within each of a plurality of virtual talk groups via an interoperability system separate from the plurality of endpoints and comprising a hardware interface configured to receive and transmit communications among the plurality of endpoints within each of the plurality of virtual talk groups, facilitating communications comprising:
        receiving a first communication from a first endpoint of at least one virtual talk group; and
        relaying the first communication to a second endpoint within the at least one virtual talk group, the second endpoint unable to receive the first communication directly from the first endpoint;
    monitoring the communications between the plurality of endpoints within each of the plurality of virtual talk groups;
    upon detecting the first communication within a first virtual talk group of the plurality of virtual talk groups, activating a first indicator, the first indicator indicating the detection of the first communication;
    changing at least one feature of the first indicator after activating the first indicator and before deactivating the first indicator, the change to the first indicator indicative of a status of communications within the first virtual talk group; and
    upon the occurrence of a first deactivating event, deactivating the first indicator.

2. The method of claim 1, wherein the first indicator is associated with the first virtual talk group and indicates the first virtual talk group as the source of the first communication.

3. The method of claim 2, further comprising, upon detecting a second communication within a second virtual talk group of the plurality of virtual talk groups, activating a second indicator associated with the second virtual talk group, the second indicator indicating the second virtual talk group as the source of the second communication.

4. The method of claim 1, wherein the occurrence of the first deactivating event comprises receiving an acknowledgement from a user indicating the user is aware of the detected first communication.

5. The method of claim 1, wherein the occurrence of the first deactivating event comprises an expiration of a first amount of activation time.

6. The method of claim 1:
    wherein the occurrence of the first deactivating event comprises detecting a second communication within a second virtual talk group of the plurality of virtual talk groups; and
    further comprising, upon detecting the second communication within the second virtual talk group, activating a second indicator, the second indicator indicating the second communication detected was from the second virtual talk group.

7. The method of claim 1, further comprising, upon detecting the first communication within the first virtual talk group of the plurality of virtual talk groups, incrementing a counter to count the number of communications detected.

8. The method of claim 1, further comprising starting a first timer at the end of the detected first communication to indicate elapsed time since the end of the detected first communication.

9. The method of claim 1, further comprising starting a second timer at the beginning of the detected first communication to indicate elapsed time since the beginning of the detected first communication.

10. The method of claim 1, further comprising:
    starting a third timer at the beginning of the detected first communication; and
    stopping the third timer at the end of the detected first communication to indicate elapsed time of the first communication.

11. The method of claim 1, wherein the first indicator associated with the first virtual talk group comprises an indicator selected from the group consisting of: an audible indicator, an illuminated indicator, an icon, a flashing indicator, and a decaying indicator.

12. The method of claim 1, wherein deactivating the first indicator comprises an action selected from the group consisting of: turning off the first indicator, changing the color of the first indicator, causing the first indicator to flash, causing the first indicator to remain solid, causing the first indicator to decay in brightness, and causing the first indicator to decay in size.

13. The method of claim 1, further comprising receiving a request to initiate the indication of the detection of communications within the plurality of virtual talk groups, the request indicating that the first indicator should be activated upon detecting a first communication within a first virtual talk group of the plurality of virtual talk groups.

14. The method of claim 1, further comprising:
    receiving a request to activate an away mode; and
    upon detecting a second communication within the first virtual talk group of the plurality of virtual talk groups after receiving the request to activate the away mode, activating a second indicator indicating the detection of the second communication, the second indicator different than the first indicator.

15. The method of claim 1, wherein the status of communications within the first virtual talk group is selected from the group consisting of currently transmitting, currently receiving and previously received.

16. The method of claim 1, the status of communications within the first virtual talk group is based on an elapsed amount of time since a communication was last detected within the first virtual talk group.

17. A system for providing an indication of a communication, comprising:
    a processor operable to facilitate communications between a plurality of endpoints within each of a plurality of virtual talk groups; and
    an interface coupled to the processor and operable to:
        receive a first communication from a first endpoint of at least one virtual talk group;
        relay the first communication to a second endpoint within the at least one virtual talk group, the second endpoint unable to receive the first communication directly from the first endpoint; and
        monitor the communications between the plurality of endpoints within each of the plurality of virtual talk groups; and
    the processor further operable to:
        upon detection by the interface of the first communication within a first virtual talk group of the plurality of virtual talk groups, activate a first indicator, the first indicator indicating the detection of the first communication;
        change at least one feature of the first indicator after activating the first indicator and before deactivating the first indicator, the change to the first indicator indicative of a status of communications within the first virtual talk group; and
        upon the occurrence of a first deactivating event, deactivate the first indicator.

18. The system of claim 17, wherein the first indicator is associated with the first virtual talk group and indicates the first virtual talk group as the source of the first communication.

19. The system of claim 18, wherein the processor is further operable to, upon detection by the interface of a second communication within a second virtual talk group of the plurality of virtual talk groups, activate a second indicator associated with the second virtual talk group, the second indicator indicating the second virtual talk group as the source of the second communication.

20. The system of claim 17, wherein:
    the interface is further operable to receive an acknowledgement from a user indicating the user is aware of the detected first communication; and
    the processor operable to deactivate the first indicator upon the occurrence of the first deactivating event comprises a processor operable to deactivate the first indicator upon receipt by the interface of the acknowledgement from the user indicating the user is aware of the detected first communication.

21. The system of claim 17, wherein the occurrence of the first deactivating event comprises an expiration of a first amount of activation time.

22. The system of claim 17, wherein:
    the interface is further operable to detect a second communication within a second virtual talk group of the plurality of virtual talk groups;
    the processor operable to deactivate the first indicator upon the occurrence of the first deactivating event comprises a processor operable to deactivate the first indicator upon detection by the interface of the second communication within the second virtual talk group of the plurality of virtual talk groups; and
    the processor is further operable to, upon detection by the interface of the second communication within the second virtual talk group, activate a second indicator, the second indicator indicating the second communication detected by the interface was from the second virtual talk group.

23. The system of claim 17, wherein the processor is further operable to, upon detection by the interface of the first communication within the first virtual talk group of the plurality of virtual talk groups, increment a counter to count the number of communications detected.

24. The system of claim 17, wherein the processor is further operable to start a first timer at the end of the detected first communication to indicate elapsed time since the end of the detected first communication.

25. The system of claim 17, wherein the processor is further operable to start a second timer at the beginning of the detected first communication to indicate elapsed time since the beginning of the detected first communication.

26. The system of claim 17, wherein the processor is further operable to:
    start a third timer at the beginning of the detected first communication; and
    stop the third timer at the end of the detected first communication to indicate elapsed time of the first communication.

27. The system of claim 17, wherein the first indicator associated with the first virtual talk group comprises an indicator selected from the group consisting of: an audible indicator, an illuminated indicator, an icon, a flashing indicator, and a decaying indicator.

28. The system of claim 17, wherein the processor operable to deactivate the first indicator comprises a processor selected from the group consisting of: a processor operable to turn off the first indicator, a processor operable to change the color of the first indicator, a processor operable to cause the first indicator to flash, a processor operable to cause the first indicator to remain solid, a processor operable to cause the first indicator to decay in brightness, and a processor operable to cause the first indicator to decay in size.

29. The system of claim 17, wherein the interface is further operable to receive a request to initiate the indication of the detection of communications within the plurality of virtual talk groups, the request indicating that the processor should activate the first indicator upon detection by the interface of the first communication within the first virtual talk group of the plurality of virtual talk groups.

30. A non-transitory computer readable medium comprising code operable to:
    facilitate communications between a plurality of endpoints within each of a plurality of virtual talk groups, the code operable to facilitate communications comprises code operable to:
        receive a first communication from a first endpoint of at least one virtual talk group; and
        relay the first communication to a second endpoint within the at least one virtual talk group, the second endpoint unable to receive the first communication directly from the first endpoint;
    monitor the communications between the plurality of endpoints within each of the plurality of virtual talk groups;
    upon detection of the first communication within a first virtual talk group of the plurality of virtual talk groups, activate a first indicator, the first indicator indicating the detection of the first communication;
    change at least one feature of the first indicator after activating the first indicator and before deactivating the first indicator, the change to the first indicator indicative of a status of communications within the first virtual talk group; and upon the occurrence of a first deactivating event, deactivate the first indicator.

31. The medium of claim 30, wherein the first indicator is associated with the first virtual talk group and indicates the first virtual talk group as the source of the first communication.

32. The medium of claim 31, wherein the code is further operable to, upon detection of a second communication within a second virtual talk group of the plurality of virtual talk groups, activate a second indicator associated with the second virtual talk group, the second indicator indicating the second virtual talk group as the source of the second communication.

33. The medium of claim 30, wherein:
the code is further operable to receive an acknowledgement from a user indicating the user is aware of the detected first communication; and
the code operable to deactivate the first indicator upon the occurrence of the first deactivating event comprises code operable to deactivate the first indicator upon receipt of the acknowledgement from the user indicating the user is aware of the detected first communication.

34. The medium of claim 30, wherein the occurrence of the first deactivating event comprises an expiration of a first amount of activation time.

35. The medium of claim 30, wherein:
the code is further operable to detect a second communication within a second virtual talk group of the plurality of virtual talk groups;
the code operable to deactivate the first indicator upon the occurrence of a first deactivating event comprise code operable to detect a second communication within a second virtual talk group of the plurality of virtual talk groups; and
the code is further operable to, upon detection of the second communication within the second virtual talk group, activate a second indicator, the second indicator indicating the second communication detected was from the second virtual talk group.

36. The medium of claim 30, wherein the code is further operable to, upon detection of the first communication within the first virtual talk group of the plurality of virtual talk groups, increment a counter to count the number of communications detected.

37. The medium of claim 30, wherein the code is further operable to start a first timer at the end of the detected first communication to indicate elapsed time since the end of the detected first communication.

38. The medium of claim 30, wherein the code is further operable to start a second timer at the beginning of the detected first communication to indicate elapsed time since the beginning of the detected first communication.

39. The medium of claim 30, wherein the code is further operable to:
start a third timer at the beginning of the detected first communication; and
stop the third timer at the end of the detected first communication to indicate elapsed time of the first communication.

40. The medium of claim 30, wherein the first indicator associated with the first virtual talk group comprises an indicator selected from the group consisting of: an audible indicator, an illuminated indicator, an icon, a flashing indicator, and a decaying indicator.

41. The medium of claim 30, wherein the code operable to deactivate the first indicator comprises code operable to perform an action selected from the group consisting of: turning off the first indicator, changing the color of the first indicator, causing the first indicator to flash, causing the first indicator to remain solid, causing the first indicator to decay in brightness, and causing the first indicator to decay in size.

42. The medium of claim 30, wherein the code is further operable to receive a request to initiate the indication of the detection of communications within the plurality of virtual talk groups, the request indicating that the first indicator should be activated upon detection of the first communication within the first virtual talk group of the plurality of virtual talk groups.

* * * * *